(12) United States Patent
Stuart et al.

(10) Patent No.: US 11,073,088 B2
(45) Date of Patent: Jul. 27, 2021

(54) GEARBOX MOUNTING IN A TURBOMACHINE

(71) Applicant: General Electric Company, Schenectady, NY (US)

(72) Inventors: Alan Roy Stuart, Cincinnati, OH (US); Thomas Ory Moniz, Loveland, OH (US)

(73) Assignee: General Electric Company, Schenectady, NY (US)

( * ) Notice: Subject to any disclaimer, the term of this patent is extended or adjusted under 35 U.S.C. 154(b) by 312 days.

(21) Appl. No.: 16/280,548

(22) Filed: Feb. 20, 2019

(65) Prior Publication Data

US 2020/0263611 A1    Aug. 20, 2020

(51) Int. Cl.
*F02C 7/36*    (2006.01)

(52) U.S. Cl.
CPC ............ *F02C 7/36* (2013.01); *F05D 2220/32* (2013.01)

(58) Field of Classification Search
CPC ........ F04D 19/024; F04D 19/026; F02C 7/36; F05D 226/040311
See application file for complete search history.

(56) References Cited

U.S. PATENT DOCUMENTS

| | | |
|---|---|---|
| 3,363,831 A | 1/1968 | Gamier |
| 3,703,081 A | 11/1972 | Krebs et al. |
| 4,098,127 A | 7/1978 | Shiga et al. |
| 4,621,978 A | 11/1986 | Stuart |
| 4,860,537 A | 8/1989 | Taylor |
| 4,879,792 A | 11/1989 | O'Connor |
| 4,969,325 A | 11/1990 | Adamson et al. |
| 4,976,102 A | 12/1990 | Taylor |
| 5,167,167 A | 12/1992 | Tiernan, Jr. et al. |
| 5,272,868 A | 12/1993 | Ciokajlo et al. |
| 5,537,861 A | 7/1996 | Seitelman et al. |
| 5,724,271 A | 3/1998 | Bankert et al. |
| 6,126,391 A | 10/2000 | Atraghji et al. |
| 6,619,030 B1 | 9/2003 | Seda et al. |
| 6,666,017 B2 | 12/2003 | Prentice et al. |
| 6,739,120 B2 | 5/2004 | Moniz et al. |
| 6,976,679 B2 | 12/2005 | Goss et al. |
| 7,195,446 B2 | 3/2007 | Seda et al. |
| 7,458,202 B2 | 12/2008 | Moniz et al. |
| 7,490,461 B2 | 2/2009 | Moniz et al. |
| 7,493,753 B2 | 2/2009 | Moniz et al. |
| 7,854,584 B2 | 12/2010 | Lusted et al. |
| 7,905,083 B2 | 3/2011 | Orlando et al. |
| 7,921,634 B2 | 4/2011 | Orlando et al. |
| 7,937,927 B2 | 5/2011 | Suciu et al. |
| 7,966,806 B2 | 6/2011 | Henry et al. |
| 8,172,512 B2 | 5/2012 | Short et al. |
| 8,736,120 B2 | 5/2014 | Maeda et al. |
| 8,784,045 B2 | 7/2014 | Zoric et al. |
| 8,887,564 B2 | 11/2014 | Harrison |

(Continued)

*Primary Examiner* — Richard A Edgar
(74) *Attorney, Agent, or Firm* — Dority & Manning, P.A.

(57) ABSTRACT

A gas turbine engine includes a frame member extending generally along an axial direction and defining a plurality of slots spaced along a circumferential direction; and a gearbox including a ring gear, a plurality of planet gears, and a sun gear, the plurality of planet gears each positioned at least partially in a respective slot of the plurality of slots defined by the frame member such that the frame member extends through the gearbox.

20 Claims, 9 Drawing Sheets

(56) References Cited

U.S. PATENT DOCUMENTS

| | | |
|---|---|---|
| 8,950,171 B2 | 2/2015 | Suciu et al. |
| 9,028,200 B2 | 5/2015 | Suciu et al. |
| 9,080,512 B2 | 7/2015 | Suciu et al. |
| 9,217,331 B1 | 12/2015 | Yellapragada et al. |
| 9,525,321 B2 | 12/2016 | Yamanaka et al. |
| 9,689,314 B2 | 6/2017 | Lemarchand et al. |
| 9,695,751 B2 | 7/2017 | Kupratis et al. |
| 9,718,536 B2 | 8/2017 | Danielson et al. |
| 9,885,249 B2 | 2/2018 | Munsell et al. |
| 10,047,608 B2 | 8/2018 | Phylip-Jones et al. |
| 10,060,357 B2 | 8/2018 | Adams et al. |
| 10,669,946 B2 * | 6/2020 | Sheridan .................. F02C 7/36 |
| 2010/0196139 A1 | 8/2010 | Beeck et al. |
| 2016/0298539 A1 | 10/2016 | Roberge |
| 2016/0298751 A1 | 10/2016 | Mccune |
| 2017/0314418 A1 | 11/2017 | Lighty et al. |
| 2018/0058569 A1 | 3/2018 | Slayter et al. |
| 2018/0094589 A1 | 4/2018 | Auker et al. |
| 2018/0128168 A1 | 5/2018 | Suciu et al. |
| 2018/0141643 A1 | 5/2018 | Fages |
| 2018/0163845 A1 | 6/2018 | van der Merwe et al. |
| 2018/0209290 A1 | 7/2018 | Port |
| 2018/0209335 A1 | 7/2018 | Stuart et al. |
| 2018/0223732 A1 | 8/2018 | Clements et al. |
| 2018/0274527 A1 | 9/2018 | Snell |

* cited by examiner

GEARBOX MOUNTING IN A TURBOMACHINE

FIELD

The present subject matter relates generally to a turbomachine, and more particularly, to a gearbox coupling in a turbomachine.

BACKGROUND

Gas turbine engines generally include a turbine section downstream of a combustion section that is rotatable with a compressor section to rotate and operate the gas turbine engine to generate power, such as propulsive thrust. Certain gas turbine engines further include a fan driven by a turbine within the turbine section, such as a low pressure turbine of the turbine section.

In order to increase an efficiency of the fan, at least certain recent gas turbine engines provide a reduction gearbox to reduce a rotational speed of the fan relative to the turbine driving the fan. Depending on where the gearbox is positioned within the gas turbine engine, the gearbox may block a compressor center frame from supporting various rotating components located forward of the gearbox. Such may therefore require a compressor forward frame of the gas turbine engine to be bolstered to support such components, leading to a heavier gas turbine engine.

Accordingly, the inventors of the present disclosure have discovered that a mounting configuration for a gearbox within a gas turbine engine that allows a compressor center frame to support various rotating components at a location forward of the gearbox would be useful.

BRIEF DESCRIPTION

Aspects and advantages of the invention will be set forth in part in the following description, or may be obvious from the description, or may be learned through practice of the invention.

In one exemplary embodiment of the present disclosure a gas turbine engine is provided. The gas turbine engine defines an axial direction, a radial direction, and a circumferential direction. The gas turbine engine includes a frame member extending generally along the axial direction and defining a plurality of slots spaced along the circumferential direction; and a gearbox including a ring gear, a plurality of planet gears, and a sun gear, the plurality of planet gears each positioned at least partially in a respective slot of the plurality of slots defined by the frame member such that the frame member extends through the gearbox.

In certain exemplary embodiments the ring gear is positioned outward of the plurality of slots of the frame member along the radial direction, and wherein the sun gear is positioned inward of the plurality of slots of the frame member along the radial direction.

In certain exemplary embodiments the frame member includes a forward section forward of the gearbox, an aft section aft of the gearbox, and a plurality of extension members extending between the forward section and the aft section, wherein the plurality of extension members are spaced from one another along the circumferential direction to define the plurality of slots.

For example, in certain exemplary embodiments the gas turbine engine further includes a rotating spool; and a structural component, wherein the aft section of the frame member is coupled to the structural component and wherein the forward section is configured for supporting the rotating spool.

For example, in certain exemplary embodiments the gas turbine engine further includes a compressor section including a compressor and defining in part a core air flowpath of the gas turbine engine, wherein the structural component is a strut extending through the core air flowpath of the gas turbine engine downstream of the compressor of the compressor section.

For example, in certain exemplary embodiments the gas turbine engine further includes a compressor section including a compressor, wherein the compressor includes a plurality of first speed compressor rotor blades, wherein the rotating spool is coupled to the plurality of first speed compressor rotor blades for driving the plurality of first speed compressor rotor blades, and wherein the frame member supports rotation of the spool at a location forward of the gearbox.

In certain exemplary embodiments the frame member includes a forward section located forward of the gearbox, and wherein the gas turbine engine further includes a fan section including a fan, wherein the forward section of the frame member supports rotation of the fan.

In certain exemplary embodiments the gas turbine engine further includes a compressor section including a compressor including a plurality of first speed compressor rotor blades; a turbine section including a turbine including a plurality of turbine rotor blades; and a spool rotatable by the plurality of turbine rotor blades and coupled to the plurality of first speed compressor rotor blades for driving the plurality of first speed compressor rotor blades, wherein the spool is further coupled to the sun gear of the gearbox.

For example, in certain exemplary embodiments the compressor further includes a plurality of second speed compressor rotor blades, wherein the ring gear of the gearbox is coupled to the plurality of second speed compressor rotor blades for driving the plurality of second speed compressor rotor blades.

For example, in certain exemplary embodiments the gearbox is configured as a reversing gearbox such that the sun gear rotates in a first rotational direction and the ring gear rotates in a second rotational direction opposite the first rotational direction.

In certain exemplary embodiments the gas turbine engine further includes a compressor section including a compressor, wherein the gearbox is positioned inward of the compressor of the compressor section along the axial direction of the gas turbine engine.

In certain exemplary embodiments the plurality of planet gears includes at least three planet gears and up to eight planet gears.

In certain exemplary embodiments each of the planet gears defines a local axis and is rotatably coupled to the frame member such that it is rotatable about its local axis relative to the frame member.

In certain exemplary embodiments the frame member is coupled to the gearbox, and wherein the gas turbine engine further includes a compressor section including a compressor including a plurality of compressor rotor blades; a spool coupled to the plurality of compressor rotor blades for driving the plurality of first speed compressor rotor blades, wherein the spool is further coupled to the gearbox; an output member also coupled to the gearbox; and a flexible element integrated into one of the spool, the frame member, or the output member for accommodating a misalignment within the gearbox.

In another exemplary embodiment of the present disclosure, an engine defining an axial direction, a radial direction, and a circumferential direction is provided. The engine includes a frame member extending generally along the axial direction and including a forward section, an aft section, and a plurality of extension members extending between the forward section and the aft section, the plurality of extension members spaced from one another along the circumferential direction; and a gearbox including a first gear, a plurality of second gears, and a third gear, each second gear of the plurality of second gears positioned at least partially between adjacent extension members of the plurality of extension members such that the frame member extends through the gearbox.

In certain exemplary embodiments the gas turbine engine further includes a rotating spool; and a structural component, wherein the aft section of the frame member is coupled to the structural component at a location aft of the gearbox and wherein the forward section is configured for supporting the rotating spool at a location forward of the gearbox.

In certain exemplary embodiments the gearbox is a planetary gearbox, wherein the first gear is a sun gear, wherein the plurality of second gears is a plurality of planet gears, and wherein the third gear is a ring gear.

For example, in certain exemplary embodiments the ring gear is positioned outward of the plurality of slots of the frame member along the radial direction, and wherein the sun gear is positioned inward of the plurality of slots of the frame member along the radial direction.

In certain exemplary embodiments each pair of adjacent extension members of the plurality of extension members defines a slot, and wherein each second gear is positioned at least partially in a respective slot.

In certain exemplary embodiments the engine is a gas turbine engine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
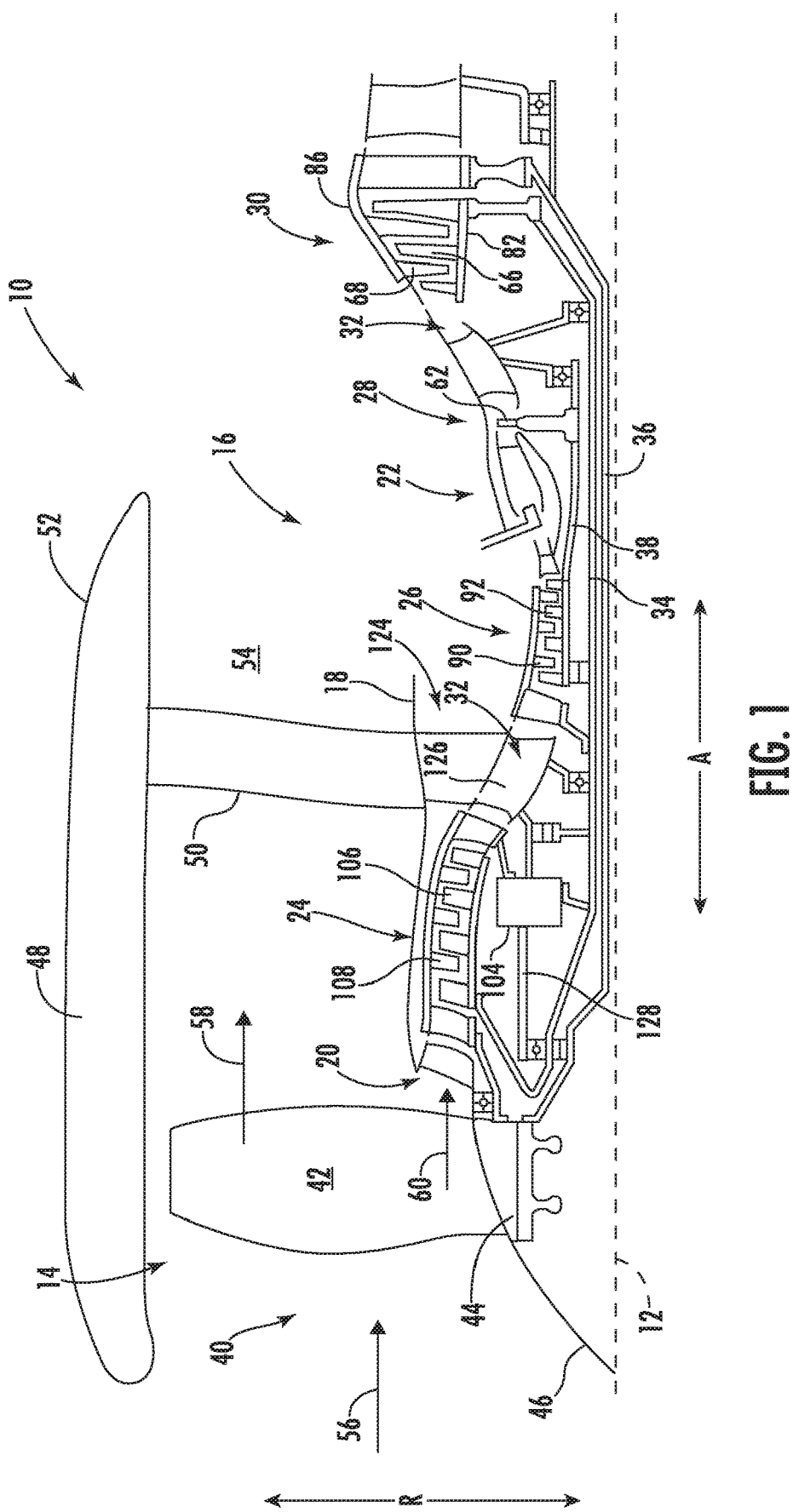
FIG. 1 is a schematic cross sectional view of an exemplary gas turbine engine incorporating exemplary aspects of the present disclosure.

Repeat use of reference characters in the present specification and drawings is intended to represent the same or analogous features or elements of the present invention.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component or feature from another and are not intended to signify location, importance, or magnitude of the individual components or features.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The present disclosure generally relates to a mounting configuration of a gearbox within an engine. For example, in certain exemplary aspects, the present disclosure may relate to the mounting of a gearbox within a compressor section of a gas turbine engine, such as a turbofan engine. The engine may generally define a radial direction, a circumferential direction, and an axial direction. Further, the engine may generally include a frame member extending generally along the axial direction. The frame member may define a plurality of slots spaced along the circumferential direction. For example, the frame member may include a forward section, an aft section, and a plurality of extension members extending between the forward section and aft section, with each pair of adjacent extension members defining a slot. The gearbox of the engine may include a first gear, a plurality of second gears, and a third gear. For example, the gearbox may be planetary gearbox such that the first gear is a sun gear, the plurality of second gears is a plurality of planet gears, and the third gear is a ring gear. The plurality of planet gears may be positioned at least partially in the slots defined by the frame member, such as, between adjacent extension members, with the sun gear being positioned inward of such slots along the radial direction and the ring gear being positioned outward such slots along the radial direction. In such a manner, the frame member may extend through the gearbox to allow the frame to support rotating components on an opposing side of the gearbox from which the frame member is supported.

Referring now to the drawings, wherein identical numerals indicate the same elements throughout the Figs., FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference), a radial direction R, and a circumferential direction C (i.e., a direction extending about the axial direction A; see FIG. 3). In general, the turbofan 10 includes a fan section 14 and a turbomachine 16 disposed downstream from the fan section 14.

The exemplary turbomachine 16 depicted generally includes a substantially tubular outer casing 18 that defines an annular inlet 20. Although only a portion of the outer casing 18 is depicted in FIG. 1, it will generally be appreciated that the outer casing 18 encases, in serial flow relationship, a compressor section including a compressor, a combustion section 22 including a combustor, and a turbine section including a turbine. More specifically, for the embodiment shown, the compressor section includes a low pressure (LP) compressor 24 and a high pressure (HP) compressor 26, with the HP compressor 26 located downstream of the LP compressor 24; and the turbine section includes a high pressure (HP) turbine 28 and a low pressure (LP) turbine 30, with the LP turbine 30 located downstream of the HP turbine 28. The compressor section, combustion section 22, and turbine section together define a core air flowpath 32 extending from the annular inlet 20 through the LP compressor 24, HP compressor 26, combustion section 22, HP turbine 28, and LP turbine 30.

As will be explained in greater detail below, the exemplary turbofan engine 10 depicted is a three-speed turbofan engine. For example, one or more of the turbines and compressors within the turbine section and compressor section, respectively, include: rotor blades rotating at a first speed, which may generally be an intermediate-speed; rotor blades rotating at a second speed, which may generally be a low-speed; and a rotor blades rotating at a third speed, which may generally be a high-speed. As such, it will be appreciated that the exemplary turbofan engine depicted generally also includes a first spool, or intermediate-speed spool 34, a second spool, or low-speed spool 36, and a third spool, or high-speed spool 38.

It will be appreciated that as used herein, the terms "high pressure" and "low pressure" are generally relative terms, and do not refer to or require any specific pressure or pressure ratio. Similarly, it will be appreciated that as used herein, the terms "high-speed," "low-speed," and "intermediate-speed" are also generally relative terms, and do not refer to or require any specific rotational speed.

Referring still to FIG. 1, for the embodiment depicted, the fan section 14 includes a fan having a plurality of fan blades 42 coupled to a disk 44 in a spaced apart manner. As depicted, the fan blades 42 extend outwardly from the disk 44 generally along the radial direction R. The fan blades 42 and disk 44 are together rotatable about the longitudinal axis 12. As will be explained in greater detail below, for the embodiment shown, the fan blades 42 and disk 44 are together rotatable about the longitudinal axis 12 by the low-speed spool 36 and the intermediate-speed spool 34.

Additionally, the disk 44 is covered by rotatable spinner cone 46 aerodynamically contoured to promote an airflow through the plurality of fan blades 42. The exemplary fan section 14 includes an annular fan casing or outer nacelle 48 that circumferentially surrounds the fan 40 and/or at least a portion of the turbomachine 16. The nacelle 48 is supported relative to the turbomachine 16 by a plurality of circumferentially-spaced outlet guide vanes 50. Moreover, a downstream section 52 of the nacelle 48 extends over an outer portion of the turbomachine 16 so as to define a bypass airflow passage 54 therebetween.

During operation of the turbofan engine 10, a volume of air 56 enters the turbofan 10 through an associated inlet of the nacelle 48 and/or fan section 14. As the volume of air 56 passes across the fan blades 42, a first portion of the air 56 as indicated by arrows 58 is directed or routed into the bypass airflow passage 54 and a second portion of the air 56 as indicated by arrow 60 is directed or routed into turbomachine 16. The ratio between the first portion of air 58 and the second portion of air 60 is commonly known as a bypass ratio. The pressure of the second portion of air 60 is then increased as it is routed through the LP compressor 24 and HP compressor 26 and into the combustion section 22, where it is mixed with fuel and burned to provide combustion gases through the turbine section. Operation of the compressor section will be discussed in greater detail below, with reference to, e.g., FIG. 4.

Figure 2:
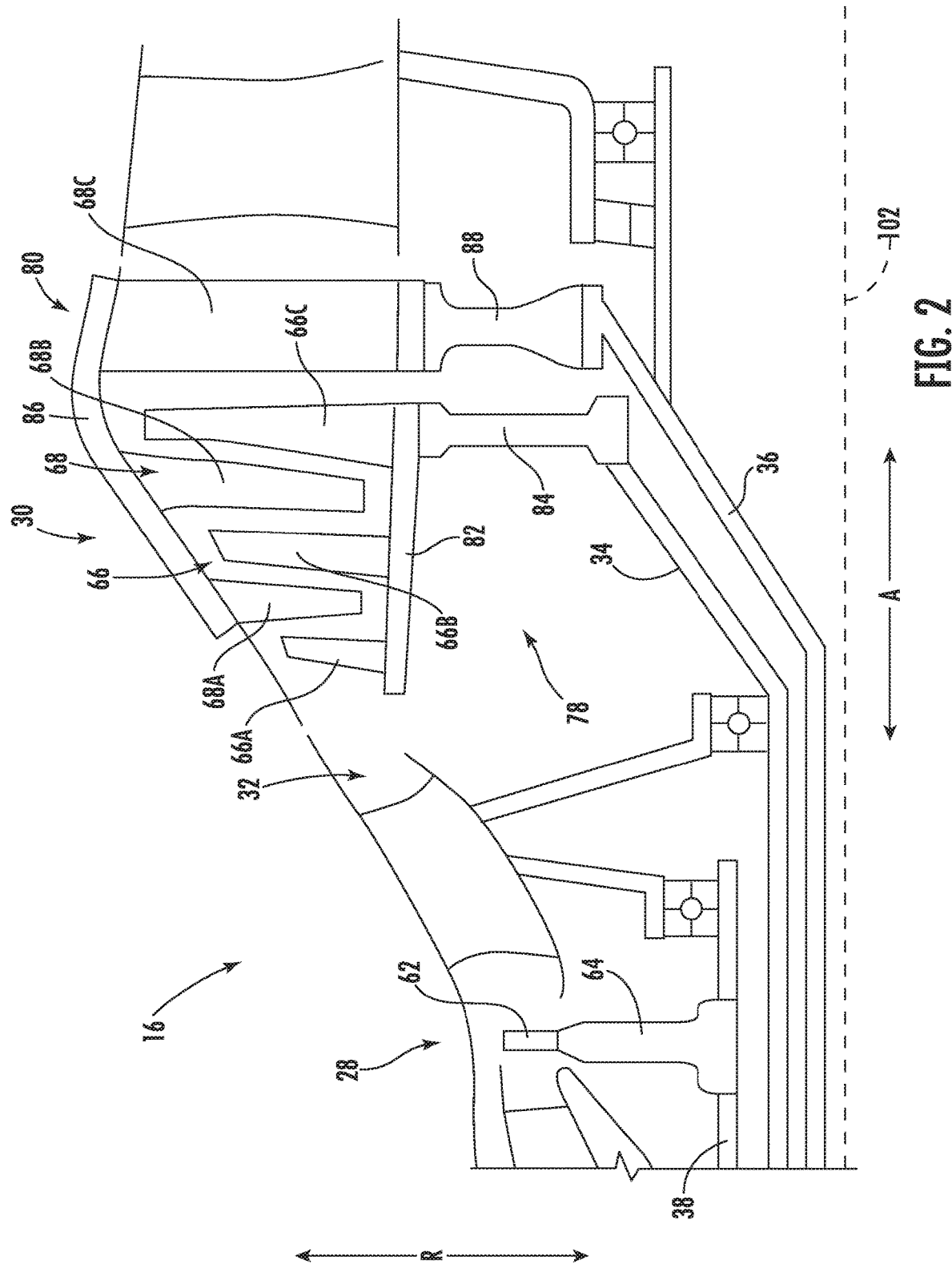
FIG. 2 is a close-up, schematic, cross sectional view of a turbine section of the exemplary gas turbine engine of FIG. 1.

Referring still to FIG. 1, and now also to FIG. 2, providing a close-up view of the turbine section of the exemplary turbofan engine 10 of FIG. 1, the HP turbine 28 includes a plurality of high-speed HP turbine rotor blades 62. More specifically, for the embodiment shown, the HP turbine 28 is a single stage turbine, including a single stage of high-speed HP turbine rotor blades 62. Each of the plurality of high-speed HP turbine rotor blades 62 are coupled to a rotor disk 64, which in turn is coupled to the high-speed spool 38. In such a manner, it will be appreciated that the plurality of high-speed HP turbine rotor blades 62 may extract energy from combustion gases from the combustion section 22 during operation and transfer such energy to the high-speed spool 38, such that the high-speed spool 38 is rotatable by the high-speed HP turbine rotor blades 62 of the HP turbine 28 and may drive operations within the compressor section, as is discussed below.

The combustion gases are then routed through the LP turbine 30 where a second portion of thermal and kinetic energy is extracted from the combustion gases via sequential stages of LP turbine rotor blades. Notably, for the embodiment shown, the LP turbine 30 includes a plurality of first speed LP turbine rotor blades and a plurality of second speed LP turbine rotor blades. The plurality of first speed turbine rotor blades of the LP turbine is configured to rotate in an opposite circumferential direction than the plurality of second speed LP turbine rotor blades. More specifically, for the embodiment shown the plurality of first speed LP turbine rotor blades is a plurality of intermediate-speed LP turbine rotor blades 66, and the plurality of second speed LP turbine rotor blades is a plurality of low-speed LP turbine rotor blades 68. As such, the plurality of intermediate-speed LP turbine rotor blades 66 may be coupled to the intermediate-speed spool 34, such that the intermediate-speed spool 34 is rotatable by the plurality of intermediate-speed LP turbine rotor blades 66. Similarly, the plurality of low-speed LP turbine rotor blades 68 is coupled to the low-speed spool 36, such that the low-speed spool 36 is rotatable by the plurality of low-speed LP turbine rotor blades 68.

Figure 3:
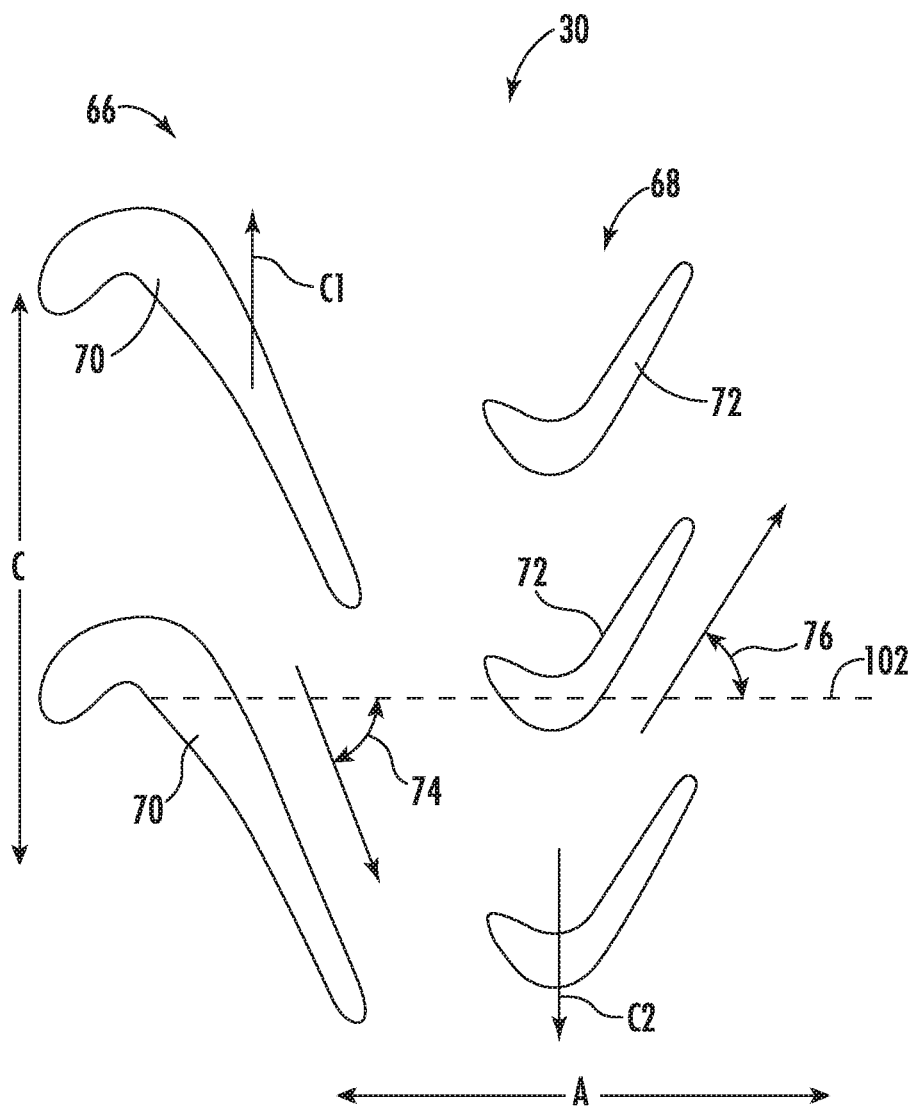
FIG. 3 is a cross sectional view depicting exemplary blade pitch angles of a turbine of a turbine section in accordance with an exemplary embodiment of the present disclosure.

More specifically, referring briefly to FIG. 3, an orientation of the plurality of intermediate-speed LP turbine rotor blades 66 and low-speed LP turbine rotor blades 68 is generally provided. More specifically, still, the embodiment of FIG. 3 generally depicts a first stage of the plurality of intermediate-speed LP turbine rotor blades 66 and a first stage of the plurality of low-speed LP turbine rotor blades 68. In the embodiment shown, the intermediate-speed LP turbine rotor blades 66 are configured to rotate in a first circumferential direction C1, while the low-speed LP turbine rotor blades 68 are configured to rotate in a second circumferential direction C2. It should be understood that the first circumferential direction C1 and the second circumferential direction C2 as used and described herein are intended to denote directions relative to one another. Therefore, the first circumferential direction C1 may refer to a clockwise rotation (viewed from downstream looking upstream) and the second circumferential direction C2 may refer to a counter-clockwise rotation (viewed from downstream looking upstream). Alternatively, the first circumferential direction C1 may refer to a counter-clockwise rotation (viewed from downstream looking upstream) and the second circumferential direction C2 may refer to a clockwise rotation (viewed from downstream looking upstream).

Referring still to FIG. 3, it will further be appreciated that for the embodiment depicted, each turbine rotor blade of the intermediate-speed LP turbine rotor blades 66 includes an airfoil 70, and similarly, each turbine rotor blade of the low-speed LP turbine rotor blades 68 includes an airfoil 72. The airfoils 70 each define an exit angle 74, and similarly the airfoils 72 each define an exit angle 76. The exit angles 74, 76 of the airfoils 70, 72, respectively, as well as the pressure and suction sides (not labeled) of such airfoils 70, 72, respectively, and other features of the turbofan engine 10, may cause the intermediate-speed LP turbine rotor blades 66 and the low-speed LP turbine rotor blades 68 to rotate in the first and second circumferential directions C1, C2, respectively. It will be appreciated, however, that in other embodiments, the airfoils 70, 72 may have any other suitable configuration.

Referring now back to FIGS. 1 and 2, it will further be appreciated that the plurality of intermediate-speed LP turbine rotor blades 66 and the plurality of low-speed LP turbine rotor blades 68 are alternatingly spaced along the axial direction A of the turbofan engine 10. As used herein, the term "alternatingly spaced along the axial direction A" refers to the plurality of intermediate-speed LP turbine rotor blades 66 including at least one turbine rotor blade positioned along the axial direction A between two axially spaced turbine rotor blades of the plurality of low-speed LP turbine rotor blades 68. For example, for the embodiment depicted, the plurality of intermediate-speed LP turbine rotor blades 66 includes three sequential stages of intermediate-speed LP turbine rotor blades 66, and similarly, the plurality of low-speed LP turbine rotor blades 68 includes three sequential stages of low-speed LP turbine rotor blades 68. A first stage of intermediate-speed LP turbine rotor blades 66A is positioned forward of the plurality of low-speed LP turbine rotor blades 68, a second stage of intermediate-speed LP turbine rotor blades 66B is positioned between a first stage of low-speed LP turbine rotor blades 68A and a second stage of low-speed LP turbine rotor blades 68B along the axial direction A, and a third stage of intermediate-speed LP turbine rotor blades 66C is positioned between the second stage of low-speed LP turbine rotor blades 68B and a third stage of low-speed LP turbine rotor blades 68C along the axial direction A. It will be appreciated, however, that in other exemplary embodiments, the intermediate-speed LP turbine rotor blades 66 and low-speed LP turbine rotor blades 68 may be arranged in any other suitable, alternatingly spaced manner and including any suitable number of stages of turbine rotor blades.

Furthermore, for the embodiment shown, each of the plurality of stages of intermediate-speed LP turbine rotor blades 66 are coupled to a first LP turbine connection assembly 78 and each of the plurality of stages of low-speed LP turbine rotor blades 68 are coupled to a second LP turbine connection assembly 80. Each of the plurality of intermediate-speed LP turbine rotor blades 66 are coupled to the first LP turbine connection assembly 78 at their respective radially inner ends, and similarly, each of the plurality of low-speed LP turbine rotor blades 68 are coupled to the second LP turbine connection assembly 80 at their respective radially outer ends. More specifically, for the embodiment shown the first LP turbine connection assembly 78 includes an inner drum 82 and at least one rotor disk 84, with each of the plurality of intermediate-speed rotor blades of the LP turbine 30 coupled at a respective radially inner ends to the inner drum 82 and the inner drum coupled to the at least one rotor disk 84. Similarly, the second LP turbine connection assembly 80 includes an outer drum 86 and at least one rotor disk 88, with each of the plurality of low-speed LP turbine rotor blades 68 coupled at their respective radially outer ends to the outer drum 86 and the outer drum 86 couple to the at least one rotor disk 88 (through the third stage of low-speed LP turbine rotor blades 68C for the embodiment shown).

It will be appreciated, however, that the mounting/coupling configuration of the LP turbine 30 is provided by way of example only. In other exemplary embodiments, the first LP turbine connection assembly 78 and/or second LP turbine connection assembly 80 may have any other suitable configuration. For example, in other embodiments, one or both of the first LP turbine connection assembly 78 and second LP turbine connection assembly 80 may include any other suitable number of rotor discs, blisks, drums, etc., and may be coupled to the adjacent stages at their respective inner ends or outer ends.

Referring back particularly to FIG. 1, operation of the compressor section and fan section 14 of the exemplary turbofan engine 10 will be described in greater detail. As noted, the compressor section includes the LP compressor 24 and the HP compressor 26. Referring first specifically to the HP compressor 26, the HP compressor 26 includes a plurality of first speed HP compressor rotor blades and a plurality of third speed HP compressor rotor blades. For the embodiment shown, the plurality of first speed HP compressor rotor blades is a plurality of intermediate-speed HP compressor rotor blades 90 and the plurality of third speed HP compressor rotor blades is a plurality of high-speed HP compressor rotor blades 92. The high-speed spool 38 is coupled to the plurality of high-speed HP compressor rotor blades 92 for driving/rotating the plurality of high-speed HP compressor rotor blades 92. Similarly, the intermediate-speed spool 34 is coupled to the plurality of intermediate-speed HP compressor rotor blades 90 for driving/rotating the plurality of intermediate-speed HP compressor rotor blades 90.

Figure 4:
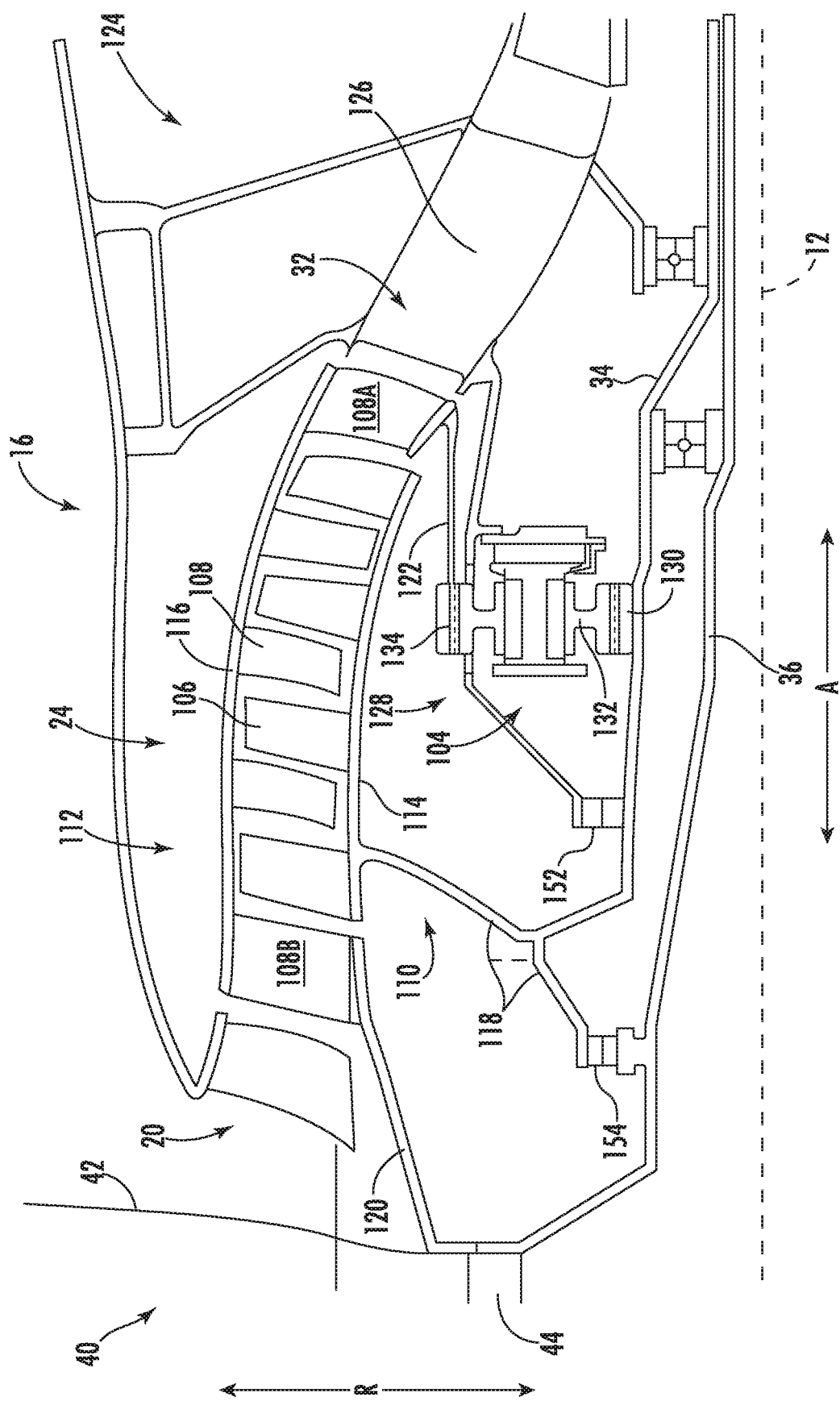
FIG. 4 is a close-up, schematic, cross sectional view of a compressor section of the exemplary gas turbine engine of FIG. 1.

Moreover, referring now also to FIG. 4, providing a close-up, schematic view of the compressor section of the exemplary turbofan engine 10 of FIG. 1, the compressor section further includes the LP compressor 24, and the turbomachine 16 further includes a gearbox 104. The LP compressor 24 generally includes a plurality of first speed LP compressor rotor blades and a plurality of second speed LP compressor rotor blades. The plurality of first speed LP compressor rotor blades is, for the embodiment shown, a plurality of intermediate-speed LP compressor rotor blades 106, and the plurality of second speed LP compressor rotor blades is, for the embodiment shown a plurality of low-speed LP compressor rotor blades 108. The intermediate-speed spool 34 is coupled to the plurality of intermediate-speed LP compressor rotor blades 106 for driving the plurality of intermediate-speed LP compressor rotor blades 106 in a first direction. The intermediate-speed spool 34 is further coupled to the plurality of low-speed LP compressor rotor blades 108 across the gearbox 104 for driving the plurality of low-speed LP compressor rotor blades 108 in a second direction, the second direction being opposite the first direction. For example, the first direction may be the same as the first circumferential direction C1 discussed above with reference to FIG. 3, and similarly, the second direction may be the same as the second circumferential direction C2 discussed above with reference to FIG. 3.

As with the counterrotating HP compressor 26 and LP turbine 30, the plurality of intermediate-speed LP compressor rotor blades 106 and low-speed LP compressor rotor blades 108 are alternatingly spaced along the axial direction A and counterrotating. Additionally, for the embodiment shown, the LP compressor 24 includes a first LP compressor connection assembly 110 for coupling each of the plurality of intermediate-speed LP compressor rotor blades 106 and a second LP compressor connection assembly 112 for coupling each of the plurality of low-speed LP compressor rotor blades 108. The first LP compressor connection assembly 110 generally includes an inner drum 114, with each of the plurality of intermediate-speed LP compressor rotor blades 106 coupled to the inner drum 114 at their respective radially inner ends, and similarly, the second LP compressor connection assembly 112 generally includes an outer drum 116, with each of the plurality of low-speed LP compressor rotor blades 108 coupled to the outer drum 116 at their respective radially outer ends.

More specifically, the first LP compressor connection assembly 110 further includes an intermediate-speed connection member 118 extending between the inner drum 114 and the intermediate-speed spool 34 (and an intermediate speed bearing 152, discussed below). Additionally, the second LP compressor connection assembly 112 further includes a forward low-speed connection member 120 and an aft low-speed connection member 122.

Moreover, it will be appreciated that the turbofan engine 10 further includes a frame assembly 124, with the frame assembly 124 including one or more structural components. The one or more structural components of the frame assembly 124 include, for the environment shown, a strut 126 (or rather a plurality of struts 126, spaced along the circumferential direction C) extending through the core air flowpath 32 at a location downstream of the LP compressor 24 and upstream of the HP compressor 26. The frame assembly 124 further includes a frame member 128 coupled to the strut 126 and extending forward, generally along the axial direction A. The frame member 128, and frame assembly 124, are configured to remain stationary during operation of the turbofan engine 10, and accordingly may be referred to as a "static" frame member 128 and frame assembly 124. Notably, as used herein, the term "generally along the axial direction A" with reference to the frame member 128, simply refers to the frame member 128, over a length of the frame member 128, extending forward or aft from the structural member to which it is attached, i.e., the strut 126 for the embodiment shown.

As will be explained in greater detail below, the frame member 128 is configured for mounting the gearbox 104 to the frame assembly 124 and extends forward from the strut 126, through the gearbox 104.

Referring still to FIG. 4, it will be appreciated that for the embodiment shown, the gearbox 104 generally includes a first gear, a second gear, and a third gear. More specifically, the gearbox 104 is generally configured as a planetary gearbox 104, such that the first gear is a sun gear 130, the second gear is a planet gear 132 (or rather, a plurality of planet gears 132) and the third gear is a ring gear 134. Additionally, as noted above, the plurality of low-speed LP compressor rotor blades 108 are driven by the intermediate-speed spool 34 across the gearbox 104. More specifically, the intermediate-speed spool 34 directly rotates the sun gear 130, and the aft low-speed connection member 122 couples the plurality of low-speed LP compressor rotor blades 108 to the ring gear 134, such that the ring gear 134 directly rotates the plurality of low-speed LP compressor rotor blades 108. The planet gear 132, or rather, the plurality of planet gears 132, are maintained stationary along the circumferential direction C through their mounting to the frame member 128. In such a manner, it will be appreciated that the gearbox 104 facilitates a rotation of the low-speed LP compressor rotor blades 108 by the intermediate-speed spool 34, while reducing a rotational speed of the low-speed LP compressor rotor blades 108 relative to the intermediate-speed spool 34, and further reversing a rotational direction of the low-speed LP compressor rotor blades 108 relative to the intermediate-speed spool 34 and intermediate-speed LP compressor rotor blades 106. The mounting of the gearbox 104 to the frame member 128 will be described in greater detail below.

Further, it will be appreciated that for the embodiment shown the fan 40 of the fan section 14 is configured to be driven by both the low-speed spool 36 and the intermediate-speed spool 34, such that a driving power for the fan 40 is shared between these two spools 34, 36. More specifically, the low-speed spool 36, which is rotatable by the plurality of low-speed LP turbine rotor blades 68, is coupled to the fan 40 directly for driving the fan 40 at the same rotational speed and in the same rotational direction (e.g., without any gear reduction). Further, the plurality of low-speed LP compressor rotor blades 108 are also coupled to the fan 40 for adding power to the fan 40, such that the intermediate-speed spool 34 is also configured for driving the fan 40. However, the intermediate-speed spool 34 is coupled to the fan 40 across the gearbox 104 and the plurality of low-speed LP compressor rotor blades 108. More specifically, for the embodiment depicted, the intermediate-speed spool 34 is coupled to an aftmost stage of the low-speed LP compressor rotor blades 108A (across the sun gear 130, planet gears 132, and ring gear 134 of the gearbox 104 and the aft low-speed connection member 122), which is coupled to the outer drum 116, which is coupled to the forward low-speed connection member 120 (across a forwardmost stage of low-speed LP compressor rotor blades 108B), which is coupled to the fan 40.

In such a manner, it will be appreciated that the fan 40 is driven by both the intermediate-speed spool 34 and the low-speed spool 36 during operation. In such a manner, it will be appreciated that the gearbox 104 may not need to transfer all the power required for driving the fan 40 (as compared to traditional geared gas turbine engines). Such may result in less wear and tear on the gearbox 104, which may accordingly allow for a smaller, lighter, more compact, and less expensive gearbox 104. Further, utilizing an alternatingly spaced LP compressor 24 and/or an alternatingly spaced HP compressor 26 may allow for a more efficient compressor section of the gas turbine engine, which may allow for a higher overall compressor ratio and/or a more compact compressor section. As such, the gas turbine engine may generally operate more efficiently. Notably, however, this is just one embodiment. In other embodiments, the LP compressor 24 and HP compressor 26 may have any other suitable configuration, as will be explained in greater detail, below.

Referring now to the positioning of the gearbox 104 within the turbofan engine 10, and more specifically, within the compressor section the turbomachine 16 of the turbofan engine 10, it will be appreciated that the gearbox 104 is positioned inward of the LP compressor 24 of the compressor section along the axial direction A of the turbofan engine 10 (i.e., forward of the aftmost stage of the low-speed LP compressor rotor blades 108A and aft of the forwardmost stage of low-speed LP compressor rotor blades 108B for the embodiment depicted).

Figure 5:
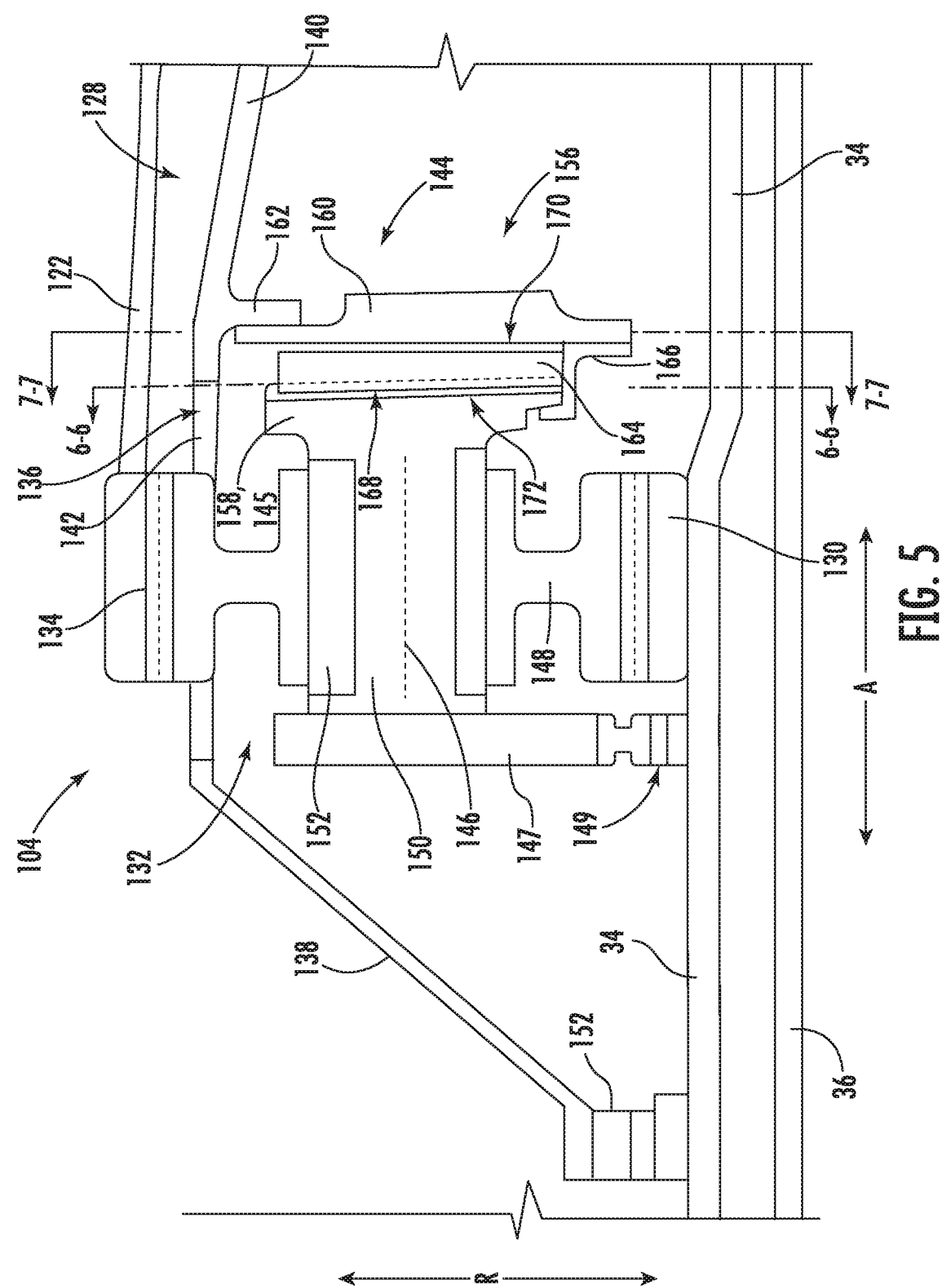
FIG. 5 is a close-up, schematic, cross sectional view of a gearbox within the compressor section of the exemplary gas turbine engine of FIG. 1.

Moreover, referring now also to FIG. 5, providing a close-up, schematic, cross-sectional view of the exemplary gearbox 104 of FIG. 4, as noted above the gearbox 104 is mounted within the compressor section of the turbomachine 16 of the turbofan engine 10 using the frame member 128 of the frame assembly 124. More specifically, the frame member 128 extends, for the embodiment shown, from the strut 126, forward and through the gearbox 104. More specifically, the frame member 128 generally defines a plurality of slots 136 spaced along the circumferential direction C and each planet gear 132 of the plurality of planet gears 132 of the gearbox 104 is positioned at least partially in a respective slot 136 of the plurality of slots 136 defined by the frame member 128. More specifically, still, for the embodiment shown, the frame member 128 generally includes a forward section 138 located forward of the gearbox 104, an aft section 140 located aft of the gearbox 104, and a plurality of extension members 142 extending between the forward section 138 and aft section 140. The plurality of extension members 142 are spaced from one another along the circumferential direction C to define the plurality of slots 136.

Figure 6:
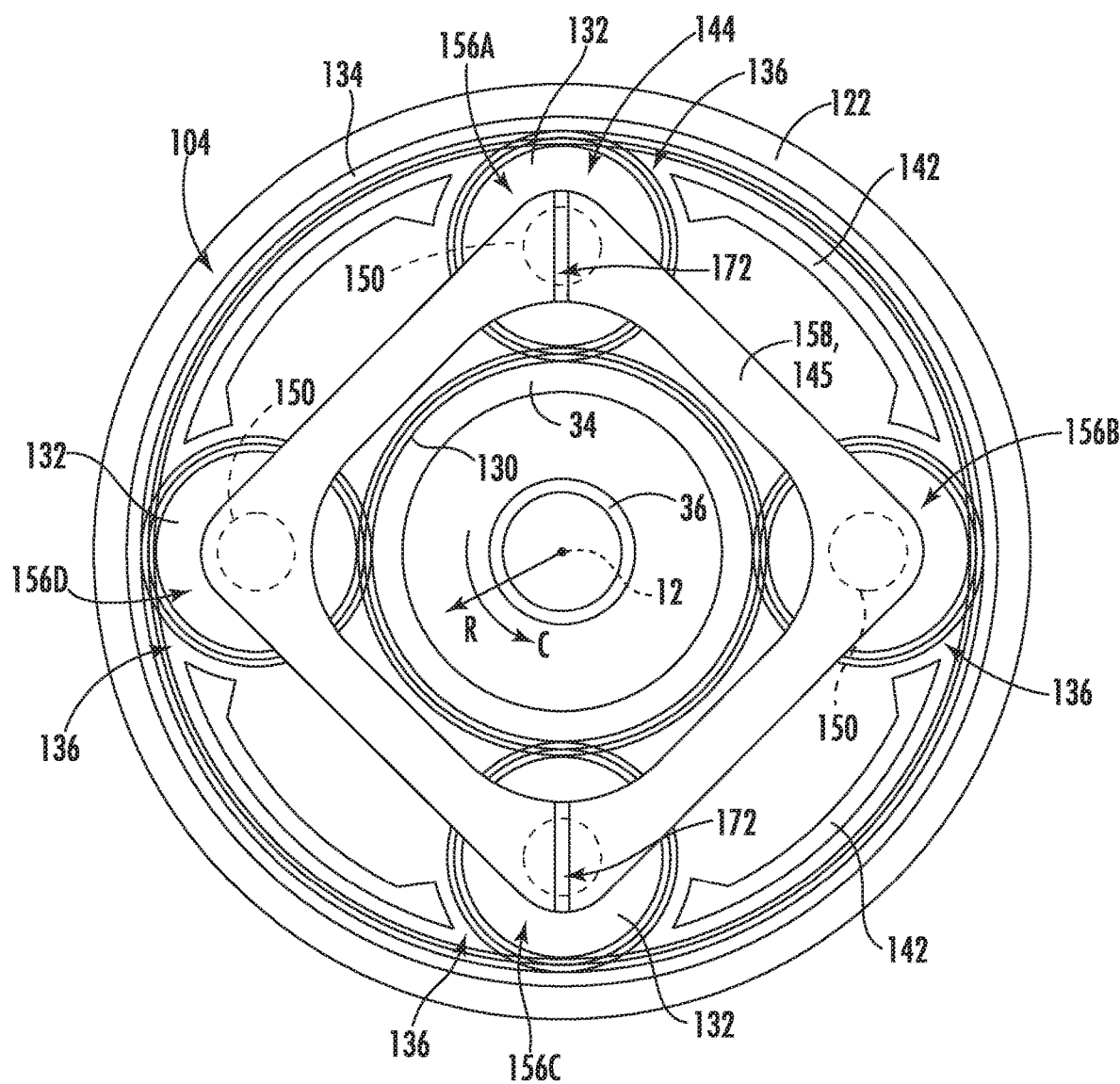
FIG. 6 is an axial, cross-sectional view of the gearbox of FIG. 5.

Referring still to FIG. 5, and now also to FIG. 6, the above configuration is described in more detail. FIG. 6 provides a partial, cross-sectional view of the gearbox 104 of FIG. 5 along Line 6-6 in FIG. 5. As is shown, the plurality of extension members 142 of the frame member 128 are spaced generally along the circumferential direction C to define the plurality of slots 136. The ring gear 134 of the gearbox 104 is positioned outward of the plurality of extension members 142 of the frame member 128 along the radial direction R, and accordingly, is also positioned outward of the plurality of slots 136 defined by the frame member 128 along the radial direction R. By contrast, the sun gear 130 is positioned inward of the plurality of extension members 142 of the frame member 128 along the radial direction R, and accordingly, is also positioned inward of the plurality of slots 136 defined by the frame member 128 along the radial direction R. Each of the plurality of planet gears 132 extends between the sun gear 130 and the ring gear 134, extending at least partially through the plurality of slots 136 and positioned at least partially between adjacent extension members 142.

For the embodiment shown, the plurality of planet gears 132 includes at least three planet gears 132 and up to, e.g., eight planet gears 132. More specifically, for the embodiment shown, the plurality of planet gears 132 includes four planet gears 132. However, in other embodiments, any other suitable number of planet gears 132 may be provided. The plurality of planet gears 132 are coupled to the frame member 128 through a gearbox coupling assembly 144, as will be described in more detail below. The gearbox coupling assembly 144 generally includes a planet gear carrier, and more specifically a first planet gear carrier 145 and a second planet gear carrier 147 positioned on opposing sides of the plurality of planet gears 132 along the axial direction A (see, particularly, FIG. 5). The first planet gear carrier 145 is coupled to the frame member 128, as will be explained in more detail below. The second planet gear carrier includes a bearing 149 at a radially inner end to support the gearbox 104 relative to the intermediate speed shaft 34. However, in other embodiments, any other gearbox coupling assembly 144 may be provided.

More specifically, referring now back to FIG. 5, each planet gear 132 of the plurality of planet gears 132 defines a local axis 146 and includes a rotatable gear 148 rotatable about the local axis 146, a planet gear shaft 150, and a planet gear bearing 152 positioned between the planet gear shaft 150 and the rotatable gear 148. As will be discussed in more detail below, the planet gear shaft 150 of each planet gear 132 is coupled to the frame member 128 through the gearbox coupling assembly 144. In such a manner, the plurality of planet gears 132 are constrained along the circumferential direction C of the gas turbine engine, while still being rotatable about their respective local axes 146. In such a manner, and as briefly mentioned above, it will be appreciated that the gearbox 104 is configured as a reversing gearbox, such that the sun gear 130 rotates in a first rotational direction and the ring gear 134 rotates in a second rotational direction opposite the first rotational direction (e.g., which may be the same as the first circumferential direction C1 and second circumferential direction C2, respectively; see FIG. 3).

Moreover, it will be appreciated that by configuring the frame member 128 and gearbox 104 to allow the frame member 128 to extend through the gearbox 104 in the manner described herein, the frame member 128 may extend forward to support rotation of, e.g., the intermediate speed spool 34 and the fan 40. For example, for the embodiment shown, the turbomachine 16 includes an intermediate speed spool bearing 152 positioned between the intermediate speed spool 34 and the forward section 138 of the frame member 128, i.e., at a location forward of the gearbox 104. In such a manner, the frame member 128 may allow the frame assembly 124 (e.g., a compressor center frame) to support the intermediate speed spool 34 at a location forward of the gearbox 104. Further, as is depicted, e.g., in FIG. 4 the gas turbine engine further includes a fan bearing 154 supporting rotation of the fan 40. The fan bearing 154 more specifically supports rotation of the low-speed spool 36 proximate the fan 40, and the fan bearing 154 is supported by the intermediate speed spool 34, which is, in turn, supported by the frame member 128 across the intermediate speed spool bearing 152.

Accordingly, given that such a configuration allows the frame member 128 to support the rotation of the fan 40, the above configuration of the frame member 128 extending through the gearbox 104 may allow for the counterrotating LP compressor 24 configuration, without requiring, e.g., a bolstered forward compressor frame assembly.

Referring still to FIG. 5, as briefly noted above, the turbofan engine 10 further includes a gearbox coupling assembly 144 for mounting the gearbox 104 to a static frame member, or more specifically, to the frame member 128 of the frame assembly 124. The gearbox coupling assembly 144 generally includes a plurality of movable connection members 156. The plurality of movable connection member 156 includes a sliding connection allowing for movement of the gearbox 104 relative to the frame member 128 in a plane perpendicular to the axial direction A of the turbofan engine 10. The plane within which the movable connection members 156 allow the gearbox 104 to move is parallel to the Line 6-6 in FIG. 5 (and parallel to the view shown in FIG. 6).

As is depicted in FIG. 5, the plurality of movable connection member 156 includes a forward piece 158 and an aft piece 160. The forward piece 158 of the plurality of movable connection member 156 is formed integrally with the shaft 150 of the respective planet gear 132. It will further be appreciated that in at least certain exemplary embodiments, the forward piece 158 is formed integrally with the first planet gear carrier 145 (see FIG. 6). The aft piece 160 is directly coupled to the frame member 128, or rather is directly coupled to a flange 162 of the frame member 128. The forward piece 158 is slidably coupled to the aft piece 160 to allow the forward piece 158 to move relative to the aft piece 160 in the plane perpendicular to the axial direction A.

Figure 7:
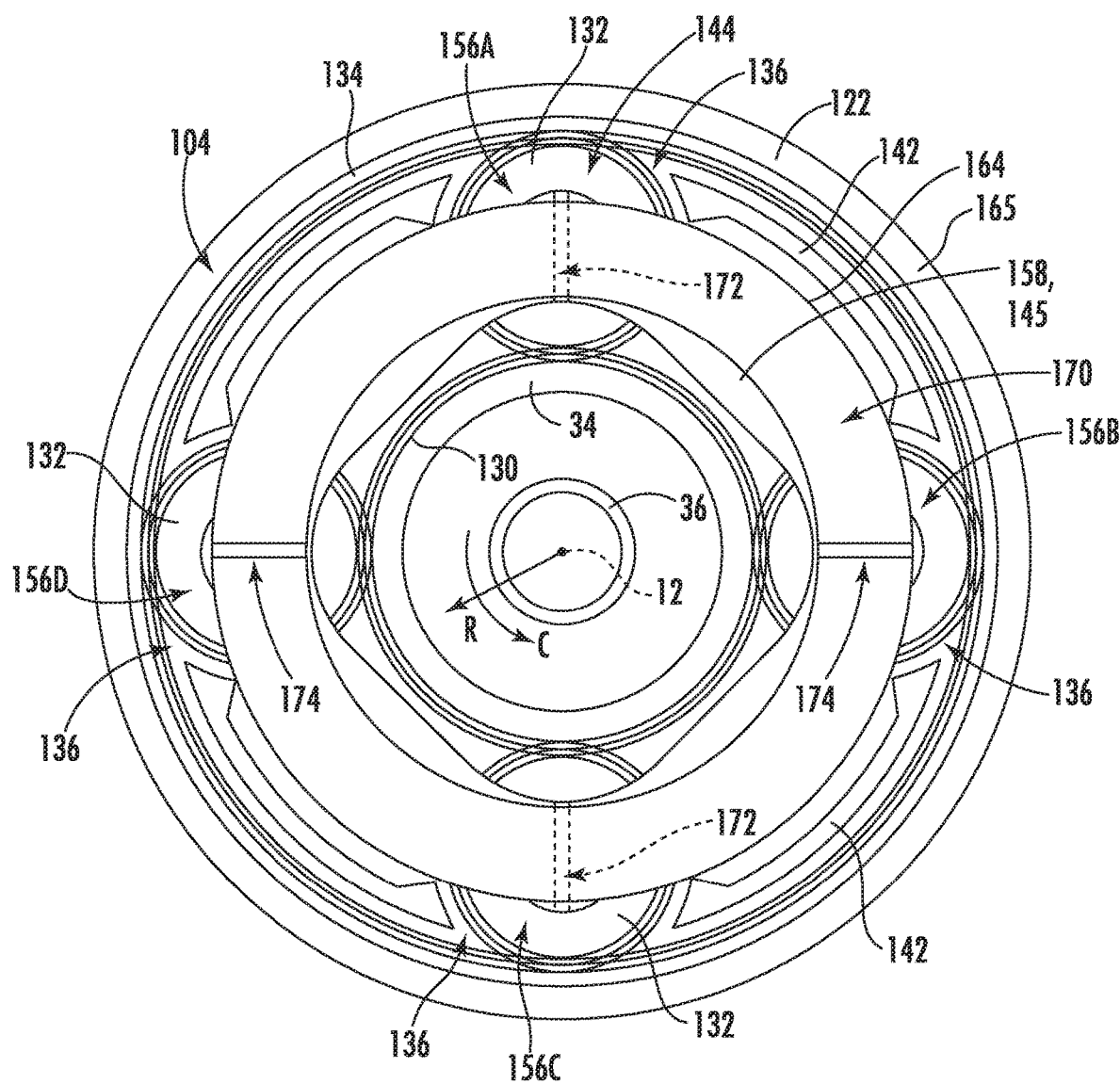
FIG. 7 is another axial, cross-sectional view of the gearbox of FIG. 5.

Reference will now also be made to FIGS. 6 and 7. As noted, FIG. 6 provides a partial, cross-sectional view of the gearbox 104 of FIG. 5 along Line 6-6 in FIG. 5. FIG. 7 provides a partial, cross-sectional view of the gearbox 104 of FIG. 5 along Line 7-7 in FIG. 5.

As is depicted in FIGS. 5 through 7, the plurality of movable connection member 156 further includes a middle piece 164 positioned between the forward piece 158 and the aft piece 160. A mount 166 is provided in the embodiment shown to keep the moveable connection members 156 together along the axial direction A (see FIG. 5). The mount 166 may extend three-hundred and sixty degrees around, e.g., an inside edge of the forward piece 158, or alternatively may only extend partially around the forward piece 158.

Additionally, the middle piece 164 includes a first side 168 and an opposite second side 170. The forward piece 158 is positioned adjacent to the first side 168 of the middle piece 164 and the aft piece 160 is positioned adjacent to the second side 170 of the middle piece 164. The forward piece 158 and the first side 168 of the middle piece 164 together form a first slidable interface 172 of the movable connection members 156. FIG. 6 shows the plurality of moveable connection members 156 with the middle and aft pieces 164, 160 removed for clarity. Additionally, the second side 170 of the middle piece 164 and the aft piece 160 together form a second slidable interface 174 of the movable connection member 156. FIG. 7 shows the plurality of moveable connection members 156 with the aft piece 160 removed for clarity.

Figure 8:
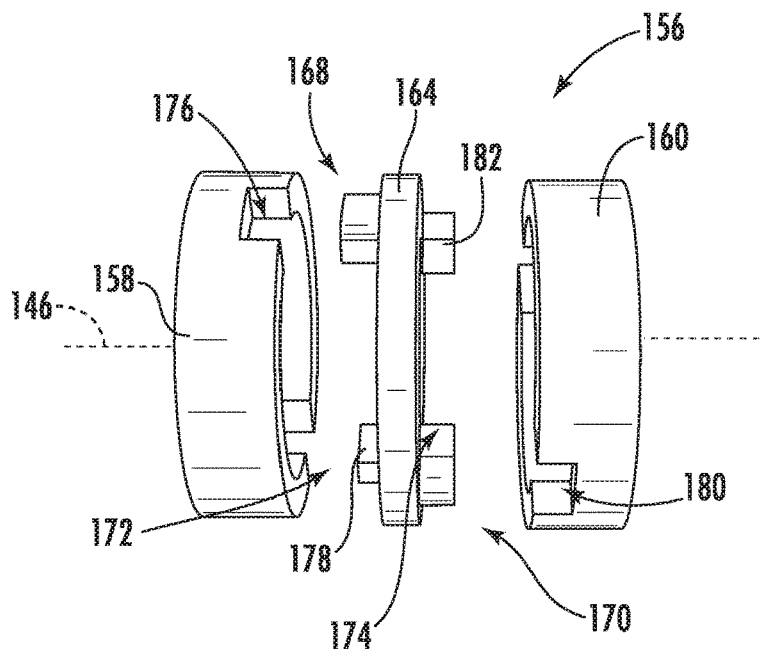
FIG. 8 is an exploded view of a moveable connection member of a gearbox coupling assembly for the gearbox of FIGS. 5 through 7.
Figure 9:
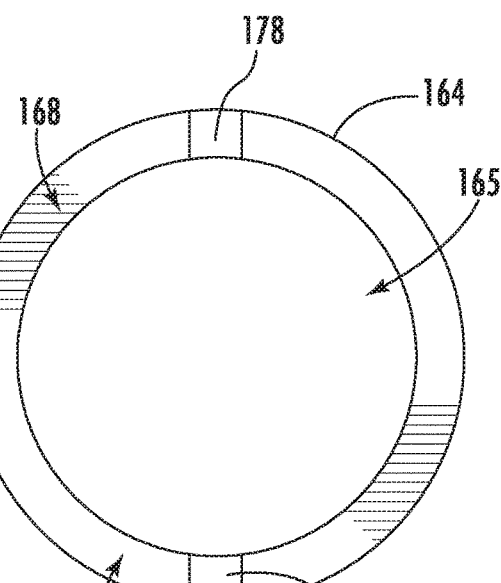
FIG. 9 is a plan view of a first side of a middle piece of the moveable connection member of FIG. 8.
Figure 10:
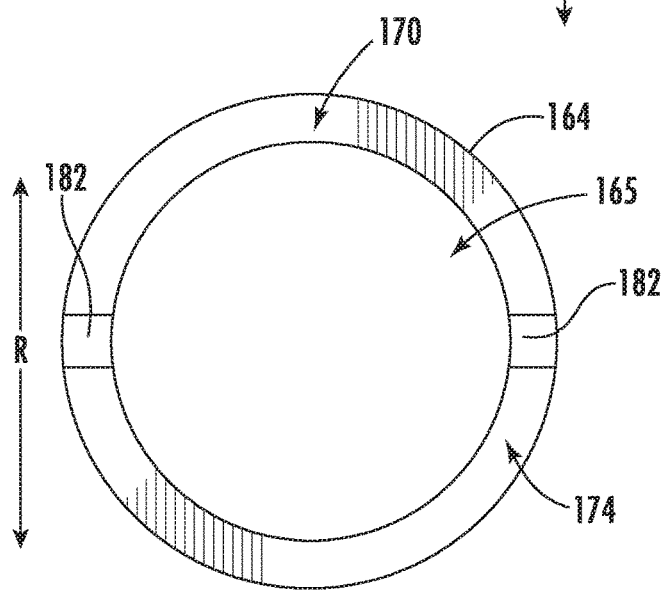
FIG. 10 is a plan view of a second side of the middle piece of the moveable connection member of FIG. 8.

Referring briefly to FIGS. 8 through 10, such a configuration is described in more detail. FIG. 8 provides an exploded view of the exemplary movable connection members 156 of FIG. 5, FIG. 9 provides a plan view of the first side 168 of the middle piece 164 of the exemplary movable connection members 156, and FIG. 10 provides a plan view of the second side 170 of the middle piece 164 of the exemplary movable connection members 156. For the embodiments depicted, the first slidable interface 172 or the second slidable interface 174, and more specifically, both the first slidable interface 172 and the second slidable interface 174 include a groove and a correspondingly shaped linear ridge slidably positioned within the respective groove. More specifically, for the embodiment shown, the forward piece 158 includes a groove 176 and the first side 168 of the middle piece 164 includes a correspondingly shaped ridge 178 slidably positioned within the groove of the forward piece 158 (i.e., when assembled, see FIG. 5). The first slidable interface 172 extends in a first direction, which for the embodiment shown is parallel to the radial direction R (FIG. 9). Similarly, for the embodiment shown, the aft piece 160 includes a groove 182 and the second side 170 of the middle piece 164 includes a correspondingly shaped ridge 184 slidably positioned within the groove 182 of the aft piece 160. The second slidable interface 174 extends in a second direction, which for the embodiment shown is perpendicular to the first direction and also parallel to the radial direction R (FIG. 10). Additionally, as is depicted, the forward piece 158, the aft piece 160, and the middle piece 164 together define an opening 165 therethrough extending along the axial direction A. For the embodiment shown, the intermediate speed shaft 34 and low speed shaft 36 each extend through the opening 165.

It will be appreciated that the plurality of movable connection members 156 may accordingly allow for relative movement between the forward piece 158 and aft piece 160 in an X-direction (e.g., a horizontal direction) and a Y-direction (e.g., a vertical direction) within the plane perpendicular to the axial direction A. Further, it will be appreciated that the first slidable interface 172 and second slidable interface 174 depicted are provided by way of example only. In other exemplary embodiments, the first slidable interface 172, second slidable interface 174, or both may have any other suitable configuration. For example, the middle piece 164 may include grooves instead of the ridges 178, 182 depicted and the first and second pieces 158, 160 may include ridges and set of the grooves 176, 180, respectively, depicted. Further, in still other embodiments, any other suitable slidable structure may be provided, such as slidable tracks, linear bearings, etc.

Referring now back specifically to FIGS. 6 and 7, the plurality of movable connection members 156 includes two "X-direction" slidable interfaces 172 and two "Y-direction" slidable interfaces 174. The two "X-direction" slidable interfaces 172 (defined by the forward piece 158 and middle piece 164) are positioned at zero degrees and one hundred and eighty degrees, and the two "Y-direction" slidable interfaces 174 (defined by the middle piece 164 and aft piece 160) are positioned at ninety degrees and two hundred and seventy degrees. Notably, these "degrees" refer to relative positions within a 360 degree span originating at the centerline 12 and in a plane perpendicular to the axial direction A, as depicted in FIGS. 6 and 7.

Positioning the movable connection members 156 in such a manner may allow for the first and second slidable interfaces 172, 174 of the plurality of moveable connection members 156 to be aligned to allow for a desired relative movement of the gearbox 104 relative to the static structures of the turbofan engine 10 (such as the frame assembly 124). For example, in the embodiment shown, the first slidable interfaces 172 of the plurality of movable connection members 156 are aligned along the X-direction, which may be a vertical direction. Further, in the embodiment shown, the second slidable interfaces 174 of the movable connection members 156 are aligned along a Y-direction, which may be a horizontal direction. Such a configuration may effectively allow for the gearbox 104 to float relative to the frame member 128, therefore accommodating any misalignments between, e.g., the intermediate speed spool 34 and the forward LP connection member 122. Despite allowing for the gearbox 104 to float in such a manner, such a configuration may still allow the plurality of planet gears 132 to transmit torque along the circumferential direction C, as the plurality of connection members may still fix the plurality of planet gears 132 relative to the circumferential direction C.

It will be appreciated, however, that the exemplary gearbox 104 and coupling assembly 144 described above are provided by way of example only. In other exemplary embodiments, any other suitable gearbox and/or coupling assembly may be provided. For example, in other embodiments, the movable connection members 156 may have any other suitable configuration allowing for a desired sliding connection to allow movement between the gearbox 104 and the one or more static frame members of the turbofan engine 10. Further, although for the embodiment shown, the first slidable interface 172 is depicted as being perpendicular to the second slidable interface 174, in other embodiments, these interfaces 172, 174 may have any other relative orientations.

Moreover, it will be appreciated that in still other exemplary embodiments of the present disclosure, the gas turbine engine may include any other suitable configuration for accommodating a misalignment across the gearbox 104. For example, referring now briefly to FIG. 11, a close-up, schematic view is depicted of a compressor section of a turbomachine 16 of a turbofan engine 10 in accordance with another exemplary embodiment of the present disclosure. The exemplary turbomachine 16 depicted in FIG. 10 may be configured in substantially the same manner as the exemplary turbomachine 16 described above. Accordingly, the same or similar numbers may refer to the same or similar part.

Figure 11:
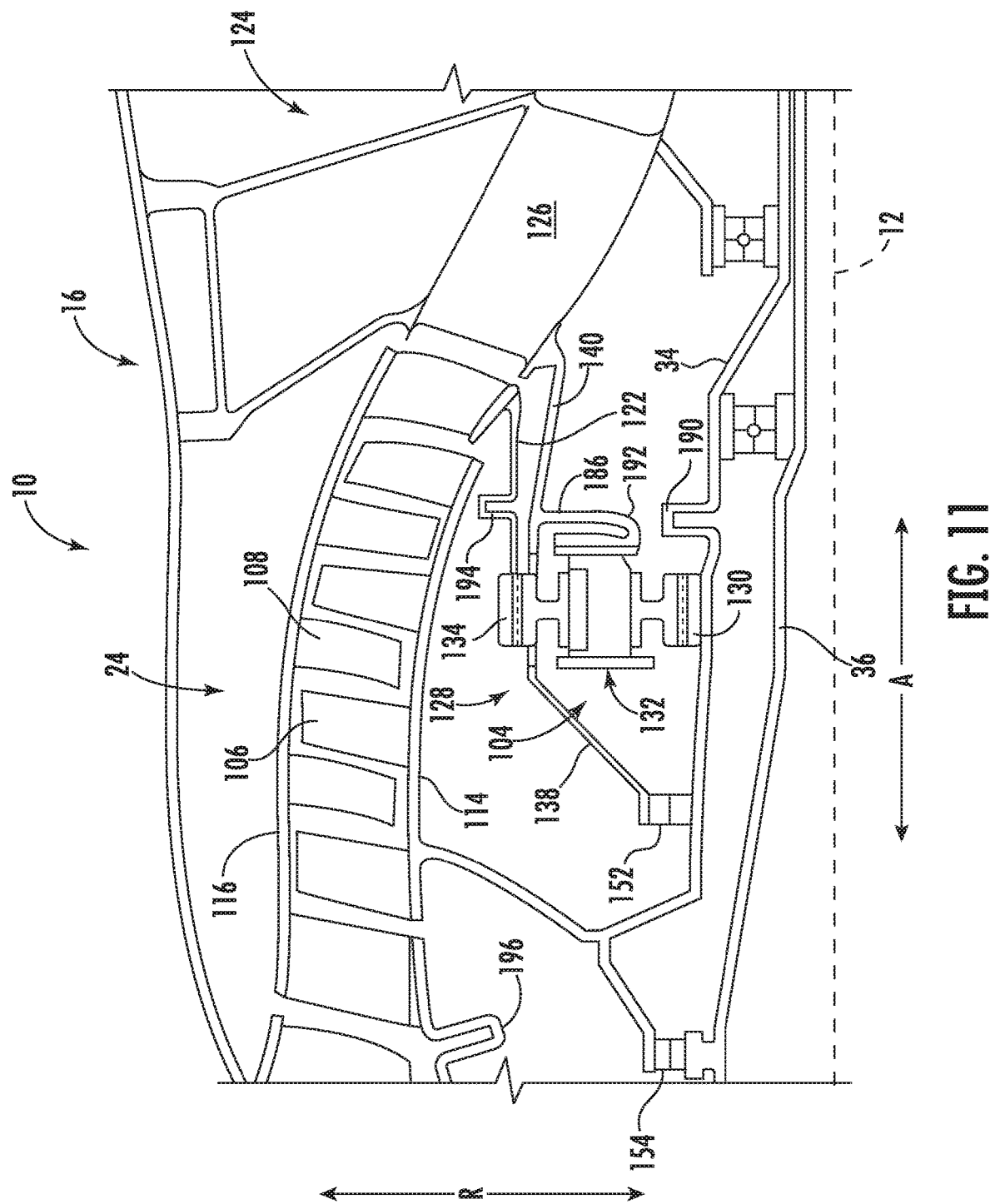
FIG. 11 is a close-up, schematic, cross sectional view of a compressor section of a gas turbine engine in accordance with another exemplary embodiment of the present disclosure.

More specifically, for the embodiment shown, the exemplary turbofan engine 10 depicted in FIG. 11 includes an alternative configuration for accommodating and misalignment across the gearbox 104. More specifically, instead of the exemplary gearbox coupling assembly 144 having a plurality of movable connection members 156 described above, the exemplary turbofan engine 10 depicted in FIG. 11 includes a flexible element integrated into one of the intermediate speed spool 34, the frame member 128, or an output member of the gearbox 104 (which is the aft low-speed connection member 122 in the embodiment shown). More specifically, for the embodiment shown, the turbofan engine 10 includes a first flexible element 190 integrated into the intermediate speed spool 34, a second flexible element 192 integrated into the frame member 128, a third flexible element 194 integrated into the output member/aft low-speed connection member 122, and a fourth flexible element 196 integrated into forward low-speed connection member 120. More specifically, the second flexible element 192 is integrated into a flange 186 the frame member 128, such that the frame member 128 maintains a substantially rigid connection to the intermediate speed bearing 152. Each of the first flexible element 180, the second flexible element 182, the third flexible element 184, and the fourth flexible element 186 are for the embodiment shown, configured as bellows.

It will be appreciated, however, that in other exemplary embodiments, any other suitable flexible element may be utilized, and further any other suitable means for accommodating a misalignment across the gearbox 104 may be provided.

Further, with reference back to the gas turbine engines discussed herein, although the exemplary gearbox 104 depicted is positioned in a compressor section of the gas turbine engines in the embodiments shown, in other embodiments, the gearbox 104 may alternatively be positioned within a turbine section of the gas turbine engine, at any other suitable location within the gas turbine engine, or alternatively may be positioned in any other suitable type of engine (e.g., an internal combustion engine, an electric engine, a hybrid electric engine, etc.).

Further, more generally it will additionally be appreciated that the exemplary turbofan engine 10 described above is provided by way of example only. In other exemplary embodiments, any other gas turbine engine configuration may be provided. For example, in certain exemplary embodiments, one or more of the LP compressor 24, HP compressor 26, or LP turbine 30 may include any suitable mounting configuration for the counterrotating, different speed rotor blades provided. Additionally, or alternatively, although the HP compressor 26 and LP turbine 30 are depicted as a counterrotating HP compressor and counterrotating LP turbine, respectively, in other embodiments, other suitable HP compressors and/or LP turbines may be provided (e.g., the HP compressor 26 may be setup as a separate intermediate pressure compressor and high pressure compressor; similarly the LP turbine 30 may be setup as a separate intermediate pressure turbine and low pressure turbine). Similarly, although the HP turbine 28 is depicted as a single stage HP turbine 28, in other embodiments, the HP turbine 28 may include any other suitable number of stages, may also be a counterrotating HP turbine 28, etc. Further, still, in other embodiments, the turbofan engine 10 may include any other suitable configuration, number, or arrangement of compressors, turbines, etc. (e.g., single rotational direction compressors and turbines, no intermediate speed components, etc.).

Moreover, it will be appreciated that although the turbofan engine 10 is depicted as a ducted turbofan engine, in other exemplary embodiments, aspects the present disclosure may be incorporated into any other suitable turbomachine 16 and gas turbine engine, such as an un-ducted turbofan engine, a turboprop engine, a turbojet engine, a turboshaft engine, etc. Further, still, although depicted as an aeronautical gas turbine engine, in other exemplary embodiments, aspects of the present disclosure may be incorporated into any other suitable gas turbine engine, such as an aeroderivative gas turbine engine (e.g., a nautical gas turbine engine), an industrial gas turbine engine, etc. further, still, it will be appreciated that in other embodiments, aspects of the present disclosure may be incorporated into any other suitable type of engine, such as any other suitable gas-powered combustion engine (such as an internal combustion engine), an electric engine, hybrid electric engine, etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims. Further, components described herein and shown in the Figures are of one embodiment, and in other embodiments may be included with other suitable component. As such, it should be appreciated that no group of components described herein and depicted in the Figures is inextricably linked unless expressly disclosed as such.

What is claimed is:

1. A gas turbine engine defining an axial direction, a radial direction, and a circumferential direction, the gas turbine engine comprising:
    a frame member extending generally along the axial direction and defining a plurality of slots spaced along the circumferential direction; and
    a gearbox comprising a ring gear, a plurality of planet gears, and a sun gear,
    the plurality of planet gears each positioned at least partially in a respective slot of the plurality of slots defined by the frame member such that the frame member extends through the gearbox.

2. The gas turbine engine of claim 1,
    wherein the ring gear is positioned outward of the plurality of slots of the frame member along the radial direction, and
    wherein the sun gear is positioned inward of the plurality of slots of the frame member along the radial direction.

3. The gas turbine engine of claim 1,
    wherein the frame member comprises a forward section forward of the gearbox, an aft section aft of the gearbox, and a plurality of extension members extending between the forward section and the aft section,
    wherein the plurality of extension members are spaced from one another along the circumferential direction to define the plurality of slots.

4. The gas turbine engine of claim 3, further comprising:
    a rotating spool; and
    a structural component,
    wherein the aft section of the frame member is coupled to the structural component and
    wherein the forward section is configured for supporting the rotating spool.

5. The gas turbine engine of claim 4, further comprising:
    a compressor section comprising a compressor and defining in part a core air flowpath of the gas turbine engine,
    wherein the structural component is a strut extending through the core air flowpath of the gas turbine engine downstream of the compressor of the compressor section.

6. The gas turbine engine of claim 4, further comprising:
    a compressor section comprising a compressor,
    wherein the compressor comprises a plurality of first speed compressor rotor blades,
    wherein the rotating spool is coupled to the plurality of first speed compressor rotor blades for driving the plurality of first speed compressor rotor blades, and
    wherein the frame member supports rotation of the spool at a location forward of the gearbox.

7. The gas turbine engine of claim 1,
    wherein the frame member comprises a forward section located forward of the gearbox, and
    wherein the gas turbine engine further comprises:
    a fan section comprising a fan,
    wherein the forward section of the frame member supports rotation of the fan.

8. The gas turbine engine of claim 1, further comprising:
    a compressor section comprising a compressor comprising a plurality of first speed compressor rotor blades;
    a turbine section comprising a turbine comprising a plurality of turbine rotor blades; and
    a spool rotatable by the plurality of turbine rotor blades and coupled to the plurality of first speed compressor rotor blades for driving the plurality of first speed compressor rotor blades,
    wherein the spool is further coupled to the sun gear of the gearbox.

9. The gas turbine engine of claim 8,
    wherein the compressor further comprises a plurality of second speed compressor rotor blades,
    wherein the ring gear of the gearbox is coupled to the plurality of second speed compressor rotor blades for driving the plurality of second speed compressor rotor blades.

10. The gas turbine engine of claim 9, wherein the gearbox is configured as a reversing gearbox such that the sun gear rotates in a first rotational direction and the ring gear rotates in a second rotational direction opposite the first rotational direction.

11. The gas turbine engine of claim 1, further comprising:
    a compressor section comprising a compressor,
    wherein the gearbox is positioned inward of the compressor of the compressor section along the axial direction of the gas turbine engine.

12. The gas turbine engine of claim 1, wherein the plurality of planet gears comprises at least three planet gears and up to eight planet gears.

13. The gas turbine engine of claim 1, wherein each of the planet gears defines a local axis and is rotatably coupled to the frame member such that it is rotatable about its local axis relative to the frame member.

14. The gas turbine engine of claim 1,
    wherein the frame member is coupled to the gearbox, and
    wherein the gas turbine engine further comprises:
    a compressor section comprising a compressor comprising a plurality of compressor rotor blades; and
    a spool coupled to the plurality of compressor rotor blades for driving the plurality of first speed compressor rotor blades, wherein the spool is further coupled to the gearbox;
    an output member also coupled to the gearbox; and a flexible element integrated into one of the spool, the frame member, or the output member for accommodating a misalignment within the gearbox.

15. An engine defining an axial direction, a radial direction, and a circumferential direction, the engine comprising:
a frame member extending generally along the axial direction and comprising a forward section, an aft section, and a plurality of extension members extending between the forward section and the aft section, the plurality of extension members spaced from one another along the circumferential direction; and
a gearbox comprising a first gear, a plurality of second gears, and a third gear, each second gear of the plurality of second gears positioned at least partially between adjacent extension members of the plurality of extension members such that the frame member extends through the gearbox.

16. The engine of claim 15, further comprising:
a rotating spool; and
a structural component,
wherein the aft section of the frame member is coupled to the structural component at a location aft of the gearbox and wherein the forward section is configured for supporting the rotating spool at a location forward of the gearbox.

17. The engine of claim 15,
wherein the gearbox is a planetary gearbox, wherein the first gear is a sun gear,
wherein the plurality of second gears is a plurality of planet gears, and wherein the third gear is a ring gear.

18. The engine of claim 17,
wherein the frame member defines a plurality of slots spaced along the circumferential direction,
wherein the ring gear is positioned outward of the plurality of slots of the frame member along the radial direction, and
wherein the sun gear is positioned inward of the plurality of slots of the frame member along the radial direction.

19. The engine of claim 15,
wherein each pair of adjacent extension members of the plurality of extension members defines a slot, and
wherein each second gear is positioned at least partially in a respective slot.

20. The engine of claim 15, wherein the engine is a gas turbine engine.

* * * * *